J. BEECHLEY.
Evaporating Pan.
No. 52,952.
Patented Mar. 6, 1866.
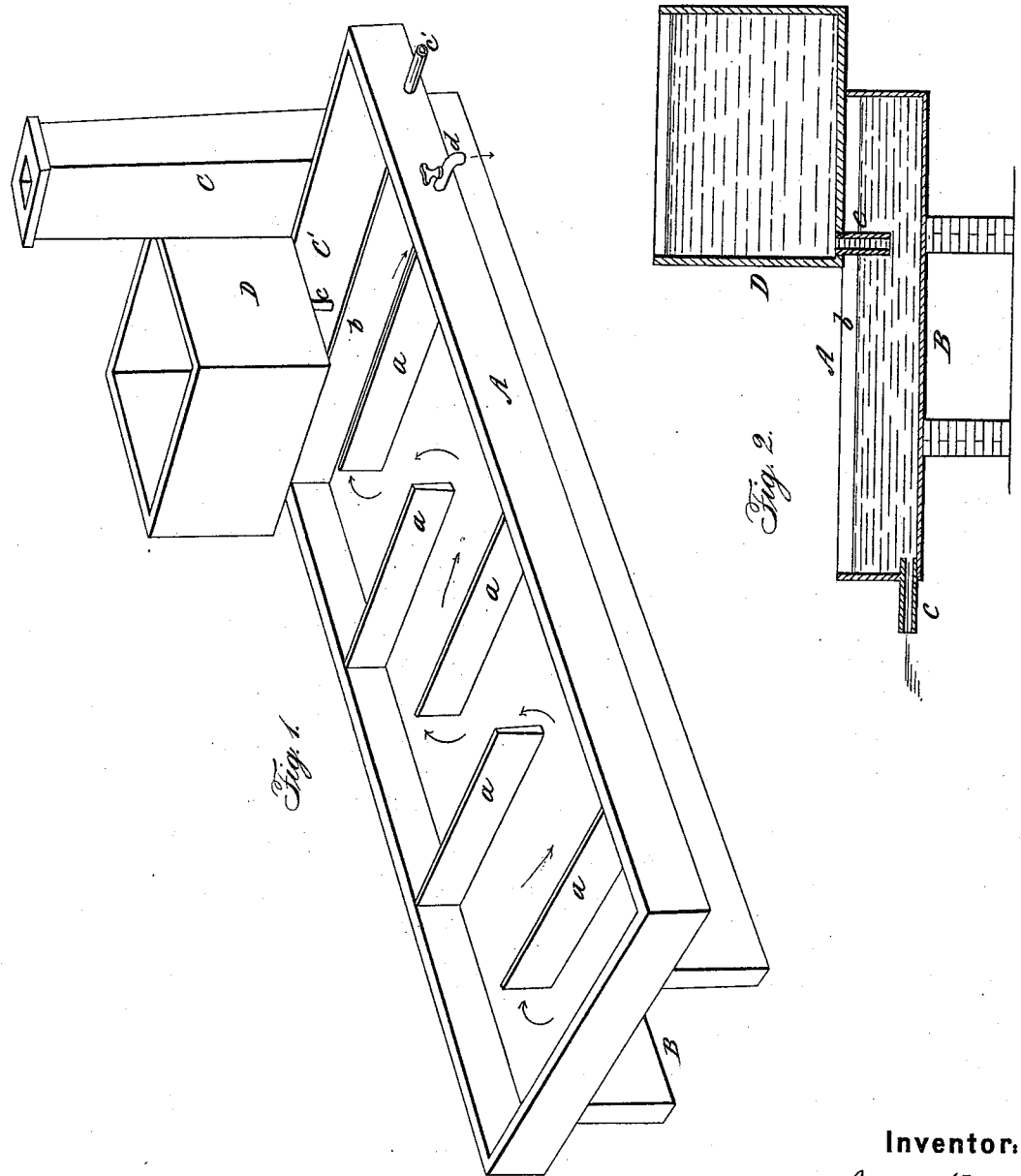
Witnesses:
R. T. Campbell
Edw. Schafer
Inventor:
John Beechley
by his Attys
Mason Fenwick & Lawrence

UNITED STATES PATENT OFFICE.

JOHN BEECHLEY, OF DAYTON, OHIO.

IMPROVED EVAPORATOR.

Specification forming part of Letters Patent No. 52,952, dated March 6, 1866.

*To all whom it may concern:*

Be it known that I, JOHN BEECHLEY, of Dayton, Montgomery county, State of Ohio, have invented a new and useful Improvement in Sirup-Evaporators; and I do hereby declare that the following is a full, clear, and exact description thereof, reference being had to the accompanying drawings, making a part of this specification, in which—

Figure 1 is a perspective view of a sirup-evaporator having my invention applied to it. Fig. 2 is a transverse section taken in a vertical plane through the cooling-apartment and water-reservoir.

Similar letters of reference indicate corresponding parts in the two figures.

This improvement in sirup-evaporators consists in providing a cool-water chamber near the point where the thick sirup is drawn from the pan, for the purpose of preventing the sirup, when it arrives at the proper consistency to be drawn off, from burning or scorching, as will be hereinafter described.

To enable others skilled in the art to understand my invention, I will describe its construction and operation.

In the accompanying drawings, A represents a shallow evaporating-pan, which is mounted upon a narrow furnace, B, of which C is the chimney. This pan has a number of narrow elevations, $a\ a\ a$, arranged within it, as shown in Fig. 1, for the purpose of causing the sirup to take a serpentine course as it flows from one end of the pan to the other. A partition, $b$, extends transversely across the pan near the chimney C, and forms a chamber, $C'$, for the purpose of containing cold water, which is supplied to it from a reservoir, D, through the pipe $c$. The water is drawn off from the chamber $C'$ by means of a pipe, $c'$. If desirable, a continuous stream of water may be caused to flow through the chamber $C'$ by having the outlet-pipe of the reservoir D and the outlet-pipe of said chamber of an equal size.

The thin sirup is poured into the pan A near the front end, and as this sirup approaches the outlet-cock $d$ it becomes thick, and consequently flows very slow, for which reason the sirup is frequently scorched before it can be drawn from the pan. To obviate this undue heating of the sirup I employ the cool-water chamber $C'$ in such close proximity to the point where the sirup is drawn off that the temperature of the sirup is prevented from rising too high.

Having thus described my invention, what I claim as new, and desire to secure by Letters Patent, is—

Providing an evaporating-pan with a cool-water chamber, $C'$, arranged in such close proximity to the finishing or drawing-off part of the pan that the sirup may be evaporated to the proper consistency without liability of scorching it, substantially as described.

JOHN BEECHLEY.

Witnesses:
JAMES TURNER,
ROBERT BROWN.